United States Patent Office 3,082,104
Patented Mar. 19, 196[?]

3,082,104
EXOTHERMIC HIGH REFRACTORY MIXTURE
Fred W. Belz, Chicago, Ill., assignor to Chromium Mining & Smelting Corporation, Limited, Sault Sainte Marie, Ontario, Canada, a corporation of Ontario
No Drawing. Filed May 6, 1959, Ser. No. 811,263
7 Claims. (Cl. 106—58)

This invention relates to an exothermic high refractory mixture for making dense solids of oxides having high melting points. The mixture is used for patching hearths, walls, roofs, doors and skewbacks of furnaces, lining ladles, and for hot tops of molds.

Magnesite, dolomite and chromite are used to line high temperature furnaces, ladles and molds. Ordinarily, the initial lining is made of a brick of these materials and repairs are made by granules of the same material, which in the case of the hearth are placed in holes and after each heat spread in a thin layer as a dressing. The problem is to fuse the granules to the hearth, and generally this is done by means of a bonding agent or flux. The heat from the hearth assists, and the fusing is completed during the next melt.

While this process is still in general use, it was early recognized that the binding agent or flux was detrimental, and attempts were made to incorporate magnesite granules with exothermic reacting materials which would produce enough heat to partially fuse the magnesite into the hole or onto the surface of the hearth, or to make molds or line ladles. These exothermic mixes, although dating back at least 25 years, have not been used, and inasmuch as the invention disclosed herein is a solution of the recognition of why these mixes did not work, applicant will discuss the problem.

Unlike the use of exothermic ladle additions where all of the components of the heat-producing reaction either pass off as gas or move up into the slag, the components in these magnesite, dolomite, etc., mixtures remain substantially in situ in the end product. There is no true melting of the magnesia; rather it is at best only slightly fused, and the whole is bonded together in a solid block by other components, some of which during firing reach the molten state. The end product may be described as high melting point oxides such as magnesia, lime and alumina, held in a matrix of lower melting point components including not only oxides but possibly metals. It follows that if the furnace or ladle wall is exposed to temperatures above the melting point of the components of this matrix, these components may drip out if the material is in a roof, or seep into the steel bath if it is in the hearth, with the result that the block becomes porous and admits elements in the steel or furnace gases which erode the block.

In making steel, the hearth is exposed to temperatures of about 1600° C. (2950° F.). The walls and roof of the hearth are exposed to gases, the temperature of which can be controlled. Where the roof is lined with a pure silica brick, with a melting point of perhaps 3080° F., the gases are held well below this temperature because silica brick is no longer able to support load at temperatures substantially below their melting point.

The first object of this invention is to produce an exothermic mixture whose end product after firing has so low a percentage of components that melt below the melting point to which they will be exposed that because they do not form a complete matrix holding the magnesite, the density of the block is not seriously impaired. Specifically, applicant has selected components for an exothermic reaction which themselves produce an oxide or silicate of fairly high melting points.

Again, applicant has selected reaction components which do not produce an excess of a pure metal. In the end product, aluminum, with a melting point of about 660° C., must be avoided, but alumina with a melting point of over 2000° C. is satisfactory. Iron does not present this problem because its melting point of 1535° C. is between the melting point of two of its oxides. FeO at 1420° C., and $Fe_2O_3$ at 1565° C. Insofar as iron is present in the mix, the end product preferably should be $Fe_2O_3$ but the presence of small amounts of metallic iron is not too detrimental.

A specific object of this invention is to produce heat by partially reducing titanium dioxide ($TiO_2$) to sesqui titanium oxide ($Ti_2O_3$). Reacting $TiO_2$ with either aluminum or silicon will produce a titanium oxide that is more dense than the oxide in the original mix, and which has a high melting point. The density of $TiO_2$ is 4.17, while the density of $Ti_2O_3$ is 4.6. The melting point of $Ti_2O_3$ is 2130° C. which is well above any operating temperature of a furnace, ladle or mold used for steel products Titanium dioxide is found in comparatively pure form in nature as rutile or anatase, and combined with iron as $FeTiO_3$, it is found as ilmenite.

A third object of this invention is to improve the density of the end product by completing the fusion of the components after all gases evolved in a reaction have escaped. When one uses a sodium or calcium nitrate silicon reaction alone, as the reaction proceeds, nitrogen escapes, and where the heat terminates at approximately the same time that the nitrogen ceases to pass off, the resulting block seems to be less dense due to the escape of the nitrogen. One of the features of this invention is the use of two heat-producing reactions, one of which evolves gas but proceeds rapidly, and the other of which evolves no gas but proceeds more slowly. When the gas producing reaction, for example, sodium nitrate and silicon, is complete, the non-gas-producing reaction such as aluminum and ilmenite continues, and it is believed that this second reaction maintains the heat for sufficient additional time so that the semi-fused material can settle and become more dense due to its own weight. The same result is obtained where the aluminum is omitted and sufficient silicon is provided to complete both reactions.

The last-mentioned feature attains another object of this invention, which is to control the speed of the reaction. By adjusting the quantity of one pair of reactants to the other pair of reactants, the reaction may be made to proceed slowly or rapidly. Failure to recognize the adverse effect of high speed reactions is responsible in part for the failure of previous mixes. Where a hole in a hearth is to be patched with a plug, the hearth is hot and the magnesite material is introduced through a door and thrown in manually be shovelfuls or by a spreading machine. Thus, where the hole in a hearth is 10" deep and 2' in diameter, a shovelful of an exothermic mixture strikes the hearth, fires, and goes to completion before the next shovelful can be applied. The result is a plug formed of horizontal laminations which make very poor contact with the wall of the hole and with each other. This enables the next melt to penetrate, further enlarge the hole and damage the plug. This object, therefore, to provide an exothermic mix which will proceed at speed such that the reaction will not be complete until after the application is complete. The reaction will proceed slowly so as to develop a fused mass without crack in itself and without openings between itself and the surface of the depression or hole to which it is applied.

Again, the ignition point of the reactants as well as the speed of the reaction can defeat the use of an exothermic mixture. In earlier experiments, some exothermic mixtures would ignite in the furnace atmosphere before reaching the hearth, proceed to termination on the hearth without properly fusing the components into sizes substantially larger than the components of the mix. By adjusting the lative quantities of the two pairs of reactants, the speed of reaction can be related to the speed of application of the mix. Where the material is being applied to a surface which has a temperature lower than the ignition point, the material can be completely positioned and then the reaction started.

Another object of this invention is to select materials which will contract as little as possible from the fused or semi-fused state.

A third feature of the invention is the use of calcium nitrate in place of sodium nitrate to produce in the end product instead of a sodium silicate, which has a low melting point, a calcium silicate, which has a much higher melting point. Other nitrates may be used, but these two are the cheapest and the best.

The following is an early successful mix:

MIX I

| Materials | 200-mesh D.B. Magnesite | 4-mesh D.B. Magnesite | Aluminum Dross |
|---|---|---|---|
| | Percent | Percent | Percent |
| Percent MgO | 85.0 | 85.0 | .5 to 10. |
| Percent SiO$_2$ | 5.0 | 5.0 | |
| Percent Al$_2$O$_3$ | 1.0 | 1.0 | up to 25. |
| Percent Fe$_2$O$_3$ | 4.5 | 4.5 | |
| Percent TiO$_2$ | | | |
| Percent CaO | 4.4 | 4.4 | |
| Percent Al | | | up to 50. |

| | Atomized Aluminum Powder | 75% FeSi | Ilmenite |
|---|---|---|---|
| | Percent | Percent | Percent |
| Percent Al | 99.5 | | |
| Percent Si | | 76.63 | |
| Percent Fe | | 23.00 | |
| Percent Fe$_2$O$_3$ | | | 24.86 |
| Percent TiO$_2$ | | | 61.00 |

Sodium Nitrate—Commercial

Mix: Percent of total
- 110.00 pts. dead-burned magnesite (75 pts. 200 mesh/35 pts. 4 mesh) — 66.57
- 5.00 pts. dross — 3.03
- 2.00 pts. aluminum powder — 1.21
- 14.00 pts. ilmenite — 8.47
- 11.75 pts. 75% FeSi (76.63% Si) — 7.11
- 22.50 pts. sodium nitrate — 13.62

165.25 pts. total — 100.01

Calculated analysis: Percent
- Percent MgO — 56.73
- Percent Al$_2$O$_3$ — 5.41
- Percent Ti$_2$O$_3$ — 4.65
- Percent Fe$_2$O$_3$ — 7.47
- Percent Si$_2$O$_3$ — 14.95
- Percent Na$_2$O — 8.57
- Percent gas evolved — 2.22

The components may be mixed in substantially any order, they all being at room temperature, and substantially free of water. All of the components have a mesh size comparable to the magnesite or are powders. Adjusting mesh sizes to control the speed of reactions is well understood in the art. The mix should be thorough in order to distribute the components as uniformly amongst each other as possible. The mix is packaged in pre-weighed paper bags, cartons, or is made available in bulk, whichever best fits the customer's specifications. In filling a hole in a hearth, the bags are more easily positioned and immediately burn away.

In the furnace, two reactions take place. The sodium nitrate combines with the silicon as follows:

$$4NaNO_3 + 5Si \rightarrow 2Na_2O \cdot percent\ SiO_2 + 2N_2 + heat$$

This reaction provides most of the heat for bonding the magnesite. The sodium silicate remains in situ while the nitrogen passes off as a gas.

The second reaction is as follows:

$$6TiO_2 + 2Al \rightarrow Al_2O_3 + 3Ti_2O_3 + heat$$

The iron oxide of FeTiO$_3$ does not enter into the reaction. All of the end products of this reaction remain in situ. The melting point of the Al$_2$O$_3$ is approximately 3720° F. (2080° C.), the melting point of Fe$_2$O$_3$ is approximately 2817° F. (1565° C.), the melting point of the Ti$_2$O$_3$ is approximately 3834° F. (2130° C.), and the melting point of the MgO is approximately 5070° F. (2800° C.). There are other oxides in the fired product, due primarily to their presence in the magnesite, as indicated in the magnesite analysis above.

The above-described reactions are only two of many reactions that occur. Moreover, the oxides and the metals during the reaction have certain fluxing actions upon each other which lower melting points. The dead-burned magnesite, as the analysis shows, is not pure MgO. There is present silica, alumina, hematite and lime, which not only because of their lower melting points reduce the melting point of the magnesite, but upon heating they flux the mixture so that it has a substantially lower eutectic. The probability is that the melting point of commercial dead-burned magnesite is some place between 3500 and 4000° F. This temperature is sufficiently high, however, to prevent the components of the magnesite generally from participating in the reaction. It is believed that the magnesite granules in the fired product are in substantially the same form and have substantially the same composition that they had in the original mix. It would be unusual for the temperature of the mass to reach 3500° F. This temperature might be reached where the mixture was dropped into a hole in a very hot hearth. The hearth itself would contribute heat, thereby supplementing the exothermic reactions so that the maximum temperature attained by the mass would be much higher than would occur if the mass were fired on a flat cold surface. Again, the temperature attained will be greater where a mass of a mixture is greater. Radiation varies inversely as the fourth power to the ratio of the mass to the volume. A ball two feet in diameter will radiate much more heat per pound of material than a ball four feet in diameter, and therefore become less hot toward its center. Where the material is placed in a hole on a hot hearth, during the first part of the action, no radiation will occur; on the contrary, the heat will come from the hot part of the hearth, thereby increasing the heat of the mass.

In the ilmenite-aluminum reaction, the probability is that the aluminum while reducing TiO$_2$ to Ti$_2$O$_3$, may also be reducing FeO to metallic iron. Applicant does not find metallic iron in the product so that either iron does not form or it is oxidized by air. The equation can be written this way:

$$6(FeO \cdot TiO_2) + 4Al \rightarrow 2Al_2O_3 + 3FeO \cdot Ti_2O_3 + 3Fe + heat$$

These reactions take place in an oxidizing atmosphere whereby the Fe could readily oxidize to FeO or Fe$_2$O$_3$.

The end product does not contain merely the compounds listed above under "Calculated analysis." It is believed that silicates are present. In general, it may be said that the magnesite particles with their impurities are held in a matrix of alumina, titania, iron oxide, silicon oxide and sodium oxide which in fact are bound up in more complicated silicate molecules (sodium oxide sublimes at 1275° C.). The melting point of the lowest melting component of the end product is not known. The fact that there is a component that has a melting point lower than the highest temperature which the plug will reach is not desirable, but not necessarily bad because how much a fused component will affect the plug depends upon how much is in the plug, i.e., how much is in the matrix which is holding the magnesite in the plug. It is believed that the matrix itself has a comparatively high melting point in view of commercial tests made in operating furnaces in the Chicago area. A large door jamb remains in good condition after thirty days of three heats a day. Bearing in mind that an open hearth furnace campaign, that is from the building of the furnace until the time it must be rebuilt, varies from 60–120 days, it will be appreciated that applicant's product is very effective.

Titanium dioxide is an important component in this mix because silicon and aluminum will reduce titanium dioxide to titanium sesquioxide ($Ti_2O_3$) but will not go further to reduce the oxide to metallic titanium. Titanium dioxide decomposes at 1640° C. Hence it is not desirable as a component of the end product. Titanium sesquioxide, $Ti_2O_3$, decomposes at 2130° C. and therefore is a very desirable component. If the silicon or aluminum would further reduce the titanium sesquioxide to produce pure metal, applicant would have a metallic component with a melting point of 1800° C. In $TiO_2$, applicant has found an oxidizing agent which will participate in an exothermic reaction to produce heat and at the same time supply an end product of comparatively high melting point and high density. The density of MgO is 3.58, while that of $Ti_2O_3$ is 4.6.

As will appear in a later mix, applicant uses only one metal, silicon, to effect the reaction with the sodium nitrate and the $TiO_2$. The silicon will complete reaction with the oxygen of sodium nitrate comparatively rapidly, depending upon the physical adjacency of silicon and sodium nitrate molecules. This is governed principally by the mesh size. The silicon will also react with the $TiO_2$, but much more slowly. This is because much more heat is required to form the $Ti_2O_3$ molecule than to form the $Na_2O$ molecule. If rutile, which is substantially pure $TiO_2$, is substituted for ilmenite, which is $FeTiO_3$, the foregoing remains true, but where ilmenite is used, the presence of the iron in the iron-titanium molecule seems to create more resistance for the silicon to reduce the $TiO_2$. The reaction, therefore, is slower.

The slower reaction makes it possible to deposit the whole mass while the reaction is proceeding throughout the whole mass. This results in a plug which is homogeneous throughout without separations or laminations due to a completion of the reaction before the addition of more of the material.

This product is primarily for holes or depressions having substantial depth. It is not planned to use the product to dress the hearth. In dressing the hearth, the granulated magnesite is laid to a depth of about one inch, and frequently only a half inch. To a limited extent, it encrusts during the next heat, but much of it is also lost so that the dressing occurs after each heat.

The end product is hard and dense and formed into a brick, and will not shatter when dropped on a hearth surface from a few feet above. The amount of contraction from a highly fused state is not exactly known, but the block itself has little porosity, and when the mix was placed in a hearth hole, the rate of reaction was sufficiently slow so that as the ingredients came up toward fusion, they flowed against the wall of the hole and did not appreciably contract away from it.

When two metals are used, they do not react exclusively with one oxidizing agent. Thus, some aluminum may pick up oxygen from the sodium nitrate, and silicon may pick up oxygen from the titanium dioxide, but in general the silicon combines with the nitrate and the aluminum with the titanium dioxide.

MIXES II, III AND IV

The following three mixes show variations between the quantity of the first metal and oxidizer, i.e., aluminum and ilmenite, and the second metal and oxidizer, i.e., ferrosilicon and sodium nitrate. These are the mixes:

MIX II

| | | Percent of tot |
|---|---|---|
| 100.00# | dead-burned magnesite (70 pts. 200 mesh/30 pts. 4 mesh) | 73.7 |
| 11.25# | sodium nitrate | 8.2 |
| 6.00# | 76.63% FeSi (4.5# available Si) | 4.4 |
| 12.00# | ilmenite | 8.8 |
| 2.50# | aluminum powder | 1.8 |
| 3.80# | aluminum dross | 2.8 |
| 135.55# | total | 100.0 |

MIX III

| | | Percent of tot |
|---|---|---|
| 100.00# | dead-burned magnesite (50 pts. 200 mesh/50 pts. 4 mesh) | 68.4 |
| 5.00# | aluminum dross | 3.4 |
| 2.50# | aluminum powder | 1.7 |
| 12.00# | ilmenite | 8.2 |
| 9.13# | 76.63% FeSi (7.0# available Si) | 6.2 |
| 17.50# | sodium nitrate | 11.9 |
| 146.13# | total | 100.0 |

MIX IV

*Blend of Mix II and Mix III*

| | | Percent of tot |
|---|---|---|
| 100.00# | dead-burned magnesite (50 pts. 200 mesh/50 pts. 4 mesh) | 72.2 |
| 4.40# | aluminum dross | 3.1 |
| 12.00# | ilmenite | 8.6 |
| 7.57# | 76.63% FeSi (5.8# available Si) | 5.4 |
| 14.40# | sodium nitrate | 10.4 |
| 138.37# | total | 100.0 |

In both mixes II and III, there is sufficient aluminum to reduce all of the titanium dioxide to titanium sesquioxide. In mix II, there is approximately two-thirds as much of the second metal ferrosilicon and oxidizer sodium nitrate as in the mix III, and as a result, the mix III will produce a higher heat than will mix II. Mix II will perform the task where the mix is being added to something that already hot and which itself is producing heat, as the hearth of a furnace immediately after tapping off the charge. The mix III will be useful where the mix is to be ignited in a cold form and all heat to be derived must come from the mix.

Mix IV is a blend of mixes II and III, and shows how a manufacturer can obtain an intermediate mix by simply passing equal quantities of mixes II and III through mixer. It is not to be inferred from mix III that the furnace operators in the steel mill can themselves make mix IV by purchasing mixes II and III. Ordinarily, they do not have the apparatus that will effect a complete intermixture.

Calcium Nitrate Mix

As stated above, sodium nitrate produces a sodium silicate which has a low melting point, approximately 1000° C. (1800° F.). Calcium nitrate reacts with ferrosilicon to produce a calcium silicate, which has a melting point of approximately 1900° C. (3400° F.), twice that of sodium silicate. The reaction is:

$$2Ca(NO_3)_2 + 5Si \rightarrow 2CaO \cdot 5SiO_2 + 2N_2$$

A typical calcium nitrate mix is as follows:

MIX V

Typical mix—

| | | Percent of tot |
|---|---|---|
| 100.00# | dead-burned magnesite (50 pts. 200 mesh/50 pts. 4 mesh) | 71.8 |
| 4.40# | aluminum dross | 3. |
| 12.00# | ilmenite | 8. |
| 14.40# | $Ca(NO_3)_2$ | 10. |
| 8.35# | 76.63% FeSi (6.4# available Si) | 6.0 |
| 139.15# | total | 100. | alculated analysis:

| | Percent |
|---|---|
| Percent MgO in mix | 61.38 |
| Percent $Al_2O_3$ in mix | 4.19 |
| Percent $Ti_2O_3$ in mix | 4.73 |
| Percent $Fe_2O_3$ in mix | 7.36 |
| Percent $SiO_2$ in mix | 13.44 |
| Percent CaO in mix | 6.68 |
| Percent $N_2$ in mix | 1.76 |
| Percent Etc. in mix | 0.46 |

*Ranges and Other Materials*

As the above mixes show, the major compound in the nd product is always MgO and these mixes are particularly designed for certain furnace open hearth applications. ead-burned dolomite, CaO·MgO, can be substituted in substantially like parts in the above mixes. Substantially e same parts of unburned magnesite or unburned dolo- ite can be used as presented in the foregoing mixes. he $CO_2$ will pass off as a gas during firing and for this ason is not as desirable as dead-burned because this dditional escaping gas may adversely affect the density f the end product. Also, a refractory chromite can substituted for the magnesite. It, too, will create me problems requiring adjustment of the oxidizers and etals.

The amount of aluminum required is that which will for actical purposes reduce the $TiO_2$ (ignoring the FeO) f the ilmenite to $Ti_2O_3$ and leave oxidized the $Al_2O_3$. luminum metal is not desired in the end product. All ould be oxidized.

While the mixes show ilmenite, any ore high in $TiO_2$ ill function, as for example, rutile, menaccanite and ikielite. The ilmenite used contained about 60% $TiO_2$. he important element is the $TiO_2$ which participates in e heat-producing reaction and cools as $Ti_2O_3$ which is nser than $TiO_2$. Applicant made several mixes with cobalt tungsten residue containing about 30% $TiO_2$. licon was used to combine in part with the oxygen of e $TiO_2$ to produce $Ti_2O_3$. In this mix, the cobalt and ngsten oxides replaced the magnesite.

The quantity of ilmenite used in all of the examples approximately 12% of the dead-burned refractory oxide. none is used, there being just the sodium nitrate and rrosilicon for producing heat, the end product will be ore porous, i.e., less dense, and will contract more from e semi-fused to the solid state. By adding the ilmenite r an equivalent), a more dense structure will be pro- ced in accordance with the amount added, excepting at a point is reached where the titanium oxide would be placing the magnesia, although the latter has the higher elting point. Applicant theorizes that because the ilmen- -aluminum reaction terminates substantially after the rmination of the sodium nitrate-ferrosilicon reaction, hich releases nitrogen gas, the mix compacts itself more cause gas no longer is being evolved in the block while e ilmenite-aluminum (or silicon) reaction continues to oduce substantial heat. In the percentages presented re, the ilmenite-aluminum reaction is comparatively ow.

As for the amount of silicon or aluminum or both, there ould be sufficient to reduce the $TiO_2$ to $Ti_2O_3$ and the $aNO_3$ to $2Na_2O·5SiO_2$. If one omits the aluminum, e silicon should reduce the $TiO_2$ to $Ti_2O_3$ and the $NaNO_3$. here only silicon is used, its reaction with the sodium r calcium) nitrate will proceed to completion before the action with the $TiO_2$ is complete. On the other hand, rrosilicon is not wanted in the end product so that if a rtion of the $TiO_2$ is not reduced due to exhaustion of $TiO_3$, the unreduced $FeTiO_3$ is still an excellent re- actory. It is better to have insufficient ferrosilicon than excess.

Summing up the matter of proportions, the granulated othermic refractory mixture consists essentially of gran- es of refractory oxides having a eutectic melting point excess of 3000° F. in an amount exceeding 40 percent by weight of the mixture and uniformly dispersed in two pairs of oxidizable metals and oxidizing agents, the oxidizable metals and oxidizing agents being present in an amount sufficient upon ignition to bond together the entire mass. One of said pairs of oxidizable metal and solid oxidizing agents may consist of aluminum and titanium dioxide; and the other pair may consist of silicon and an oxidizing agent of the group consisting of sodium nitrate and calcium nitrate. The titanium dioxide may be supplied by means of a granular ore of the group consisting of ilmenite, rutile, geikielite, and menaccanite in an amount in the mixture sufficient to provide titanium sesquioxide in excess of 4 percent by weight of the mixture.

A suitable granular exothermic refractory mixture consists essentially of the following ingredients, preferably of a grain size of not more than approximately 4 mesh, uniformly dispersed among each other and in the following amount:

By weight—
  55–70% dead-burned magnesite
Balance exothermic reacting materials comprising—
  5–12% ilmenite
  20–8% oxidizing agent of the group consisting of sodium nitrate and calcium nitrate
Balance oxidizable metal of the group of ferrosilicon and aluminum.

As for the mesh size, the finer the mesh, the more rapidly the reaction will proceed. The mixes show only the mesh size for the magnesite, but the mesh sizes of the ilmenite and the ferrosilicon are comparable to that of the magnesite for any particular mix. The aluminum (including the aluminum dross), the nitrate and the spar, $CaF_2$, are in powdered form. The mixing must proceed to a point where all of the components are uniformly distributed amongst each other. Without this, incomplete reaction may result. When the furnace is again brought up to operating temperature, any unreacted exothermics in the hearth or wall will react and this is not desirable. The reaction should proceed to completion the first time it is fired.

*Two Recently Tested Mixes*

Mix VI set forth below follows the teaching of earlier mixes excepting that it relies upon the ferrosilicon as the sole combining metal.

The mix produces an end product having less alumina and iron oxide, which greatly contributes to lowering the melting point. The product has been tested on the near slope of an open hearth approaching the door opening, and the product has held for several weeks of continuous operation. The mixture is:

MIX VI 100.0# dead-burned magnesite (50 parts 200-mesh 50 parts 4-mesh)
 12.0# ilmenite
  6.7# 90% FeSi (6.0# available Si)
 14.4# $NaNo_3$
  5.0# $CaF_2$ 138.1# total In this mix, provision is made for more heat. Three reactions take place here, and in the order of their rapidity, the first is between the calcium fluorite (spar) and oxygen in the air and oxygen from the sodium nitrate. This reaction is quite fast and is initiated at the lowest temperature. This reaction seems to promote a more even reaction between all of the reactive materials. The fluorine sublimes as does the nitrogen in the sodium nitrate. This leaves the calcium combined with oxygen to form a lime which has a high melting point. The use of the fluoride, therefore, is something analogous to the use of calcium nitrate, where we have an additional high melting point oxide in the product. The second reaction is between the sodium nitrate and the ferrosilicon, and this reaction provides most of the heat. The third reaction is between the silicon and the ilmenite to form $Ti_2O_3$ and silica. This is the slowest reaction.

Here, again, the third reaction is continuing after all of the fluorine and nitrogen have passed off as gas with the result that toward the end of the reaction there is no escaping gas tending to make the mass porous. Applicant emphasizes that at the hottest time, the components, particularly the magnesite components, do not truly melt. They become viscous and tend to settle with gravity. This produces a denser product. It should be noted also that the density of the $Ti_2O_3$ is 4.6 while the density of $TiO_2$ is 4.1. The following mix may be applied through a refractory air gun. All of the components are in powder form or of 200-mesh.

MIX VII 110.00# dead-burned magnesite (200-mesh)
2.00# aluminum powder
14.00# ilmenite
11.75# 75% FeSi
22.50# $NaNO_3$
10.00# $CaF_2$ 170.25# total For the lining of furnace doors which take considerable mechanical abuse, it has been found that chromite provides a less frangible block. The following mix is the result of a series of experiments wherein chromite concentrates, particularly those from Rhodesia, were substituted for dead-burned magnesite. In the initial mix, no ilmenite was used, the exothermic being solely a silicon-sodium nitrate or spar reaction. Difficulty was encountered in igniting the mixture and maintaining the reaction. However, on increasing the amount of sodium nitrate, the reaction was maintained but the product was relatively porous compared to the composition containing ilmenite. Applicant then commenced to add ilmenite and ultimately obtained the following mix which worked very well:

MIX VIII 100.0# chromite concentrates
10.0# spar
20.0# ilmenite
28.0# 77% FeSi
50.0# $NaNO_3$ 208.0# total Ingition was somewhat retarded, but once fairly well initiated, it proceeded to completion. It fumed, emitting a gaseous vapor, $F_2$—$N_2$—$N_2O$, which was evolved during most of the reaction. The result was a block of considerable density and hardness and not showing much silicious slag. It is believed that the ilmenite was substantially responsible for this in picking up some of the silicon and producing $Ti_2O_3$.

*Exothermic Mixtures Without the Refractory Oxides*

The exothermic components without the refractory material will probably become an article of commerce. Processors of magnesite and dolomite are themselves a specialized industry, and while at the present time applicant's assignee is buying the dead-burned magnesite and making the complete mix, this involves excessive shipping charges. It appears that the economical way of supplying the various steel making centers, near each of which is located magnesite and dolomite processors, is to prepare the exothermic mix alone, or mixed with the $TiO_2$, and then have the magnesite processors mix it uniformly with their dolomite, magnesite or chromite. These processors have adequate mixers.

As stated earlier, the order of mixing these dry ingredients is not important. Applicant has mixed just the exothermic components of the mixes described herein and then added them to the refractory oxide. The mix functions properly.

Having thus described his invention, what applicant claims is:

1. A granulated exothermic refractory mixture consisting essentially of granules of refractory oxides having a eutectic melting point in excess of 3000° F. in an amount exceeding 40% by weight of the mixture and uniformly dispersed in two pairs of oxidizable metals and solid oxidizing agents, said oxidizable metals and oxidizing agents being present in an amount sufficient upon ignition to bond together the entire mass, and one of said pair of oxidizable metal and solid oxidizing agents consisting of aluminum and titanium dioxide and the other pair consisting of silicon and the oxidizing agent is of the group consisting of sodium nitrate and calcium nitrate.

2. A granulated exothermic refractory mixture consisting essentially of an ore of the group of magnesite, dolomite and chromite, in an amount exceeding 40% by weight of the mixture, a granulated ore of the group consisting of ilmenite, rutile, geikielite and menaccanite in an amount sufficient to provide titanium sesquioxide in excess of 4% by weight of the mixture, a ferrosilicon and an oxidizing agent of the group consisting of sodium nitrate and calcium nitrate, said ore, metal and oxidizing agent being present in an amount sufficient upon firing to convert the titanium dioxide to titanium sesquioxide and to bond together the entire mass.

3. A granulated exothermic refractory mixture consisting essentially of the following ingredients, uniformly dispersed among each other, and in the following amounts:

By weight—
  55–70% dead-burned magnesite
  5–12% ilmenite
  20–8% oxidizing agent of the group consisting of sodium nitrate and calcium nitrate
  Balance oxidizable metal of the group of ferro silicon and aluminum.

4. A granulated exothermic refractory mixture composed of the following ingredients in substantially the following proportions:

100.0# dead-burned magnesite (50 parts 200-mesh, 5 parts 4-mesh)
12.0# ilmenite
6.7# 90% FeSi (6.0# available Si)
14.4# $NaNO_3$
5.0# $CaF_2$ 138.1# total 5. A granulated exothermic refractory mixture composed of the following ingredients in substantially the following proportions:

110.00# Dead-burned magnesite (200-mesh)
2.00# Aluminum powder
14.00# ilmenite
11.75# 75% FeSi
22.50# $NaNO_3$
10.00# $CaF_2$ 170.25# total 6. A granulated exothermic refractory mixture composed of the following ingredients in substantially the following proportions:

100.00# dead-burned magnesite (70 pts. 200-mesh/ pts. 4-mesh)
11.25# sodium nitrate
6.00# 76.63% FeSi (4.5# available Si)
12.00# ilmenite
2.50# aluminum powder
3.80# aluminum dross 135.55# total 7. A granulated exothermic refractory mixture composed of the following ingredients in substantially the following proportions:

00.00# dead-burned magnesite (50 pts. 200-mesh/50 pts. 4-mesh)
5.00# aluminum dross
2.50# aluminum powder
12.00# ilmenite
9.13# 76.63% FeSi (7.0# available Si)
17.50# sodium nitrate 46.13# total References Cited in the file of this patent

UNITED STATES PATENTS

| | | |
|---|---|---|
| 2,741,822 | Udy | Apr. 17, 1956 |
| 2,753,612 | Kraner | July 10, 1956 |